United States Patent [19]

Uchidoi et al.

[11] 4,124,855
[45] Nov. 7, 1978

[54] AUTOMATIC EXPOSURE CONTROL APPARATUS AND A CAMERA HAVING THE SAME

[75] Inventors: Masanori Uchidoi, Kawasaki; Hideaki Miyakawa, Inagi; Hiroshi Aizawa, Machida; Masayoshi Yamamichi, Kawasaki; Osamu Ohshima, Tokyo; Tokuichi Tunekawa, Yokohama, all of Japan

[73] Assignee: Canon Kabushiki Kaisha, Tokyo, Japan

[21] Appl. No.: 807,653

[22] Filed: Jun. 17, 1977

Related U.S. Application Data

[63] Continuation of Ser. No. 593,231, Jul. 7, 1975, abandoned.

[30] Foreign Application Priority Data

Jul. 26, 1974 [JP] Japan .................................. 49-85661

[51] Int. Cl.$^2$ ................................................ G03B 7/08
[52] U.S. Cl. ......................................... 354/24; 354/38; 354/60 R; 354/232
[58] Field of Search .................... 354/23 R, 24, 29, 30, 354/36, 37, 38, 39, 50, 51, 60 R, 232

[56] References Cited

U.S. PATENT DOCUMENTS

| | | | |
|---|---|---|---|
| 3,747,485 | 7/1973 | Suzuki | 354/29 |
| 3,829,867 | 8/1974 | Ono | 354/28 |
| 3,863,263 | 1/1975 | Itagaki | 354/51 |
| 3,882,511 | 5/1975 | Tsujimoto et al. | 354/29 |
| 3,886,568 | 5/1975 | Yazaki et al. | 354/27 |
| 3,899,789 | 8/1975 | Taguchi et al. | 354/30 |

*Primary Examiner*—Russell E. Adams
*Attorney, Agent, or Firm*—Toren, McGeady and Stanger

[57] ABSTRACT

An automatic exposure control apparatus of electric type for a photographic camera having an exposure control parameter setting means cooperative with a geometrical progression scale in isometric graduation is provided with a resistor device. The device includes a variable resistor having a grounded slider associated with the setting means upon movement thereof for providing a resistor value proportional to the amount of movement of the setting means, but to the reciprocal logarithm of the preselected parameter value. In order to minimize the complexity of a computer circuit responsive to the various outputs of the resistor device for performing photographic Appex computation, a bias voltage is applied to each of the variable resistors in a manner to produce a signal in the form of current proportional to the reciprocal of the amount of movement of the setting means. The resistor device has a single substrate having a plurality of resistor elements formed thereon by a metal coating technique and arranged for cooperation with respective sliders, thereby improving the exposure control accuracy and stabilization of the performance of the computer circuit against variation of temperature distribution in the apparatus.

3 Claims, 6 Drawing Figures

AUTOMATIC EXPOSURE CONTROL APPARATUS AND A CAMERA HAVING THE SAME

This is a continuation of application Ser. No. 593,231 filed July 7, 1975, now abandoned.

DETAILED DESCRIPTION OF THE INVENTION

This invention relates to an automatic exposure control apparatus and a camera having the same.

The prior art has provided various electronic types of exposure control apparatus for controlling the diaphragm or shutter of a photographic camera in conformance with the preselected exposure control parameters. For the purpose of setting a number of exposure control parameters such as aperture value, shutter speed and film speed, there is provided electrical setting means including, for example, the corresponding number of variable resistors arranged in the exposure control apparatus, so that upon adjustment of the variable resistors to the desired settings, the electronic computer of the apparatus derives an exposure value representing an effective exposure aperture or exposure time.

Further, it has been already proposed to apply a variable resistor to the above mentioned various exposure setting elements and the exposure elements to be controlled, for example, a detection device of diaphragm aperture value in a shutter preference type camera. Such camera has various problems such as a first problem of requiring a number of variable resistors making it difficult to provide wirings therefor within a camera when photographic computations among various exposure elements mentioned above, which are necessarily required for automatic control of exposure, are conducted electronically. A second problem is that the error in computation output caused by the lack of uniformity in the resistance value among each variable resistor, which is unavoidable in manufacturing, becomes greater than a negligible level, necessitating an adjusting device to counter said error. Furthermore, a third problem exists in that a means is required to compensate the error in the computation output derived from such properties of a resistor as having its resistance value varied depending on the variation in temperature. An object of the present invention is to eliminate the first problem. A further object is to simplify the wirings by driving various variable resistors by a common voltage source and by having a slider for detecting resistance value grounded. The invention also is to provide such relationship between the amount of shifting of the slider and the resistance value that the resistance value is in proportion with the reciprocal of the amount of shifting so that such electric signal as proportional to the logarithmic conversion value of exposure element, that is, exposure information in APEXed form, is obtained, thus simplifying the computation circuit.

Another object of the present invention is to eliminate the above mentioned second and third problems. The inventive purpose is to form a resistor which cooperates with the variable resistor on the same base plate, and at the same time, is to provide an arrangement such that the output value of a computation circuit depends on only the ratio at least between two resistors. In this manner, the lack of uniformity in the absolute value of the resistance value which inevitably takes place in the manufacturing process and the effect of variation in the resistance value caused by the change in temperature can offset each other. Thus, the yield in the manufacturing process is improved.

DESCRIPTION OF THE PREFERRED EMBODIMENT

Figure 1:
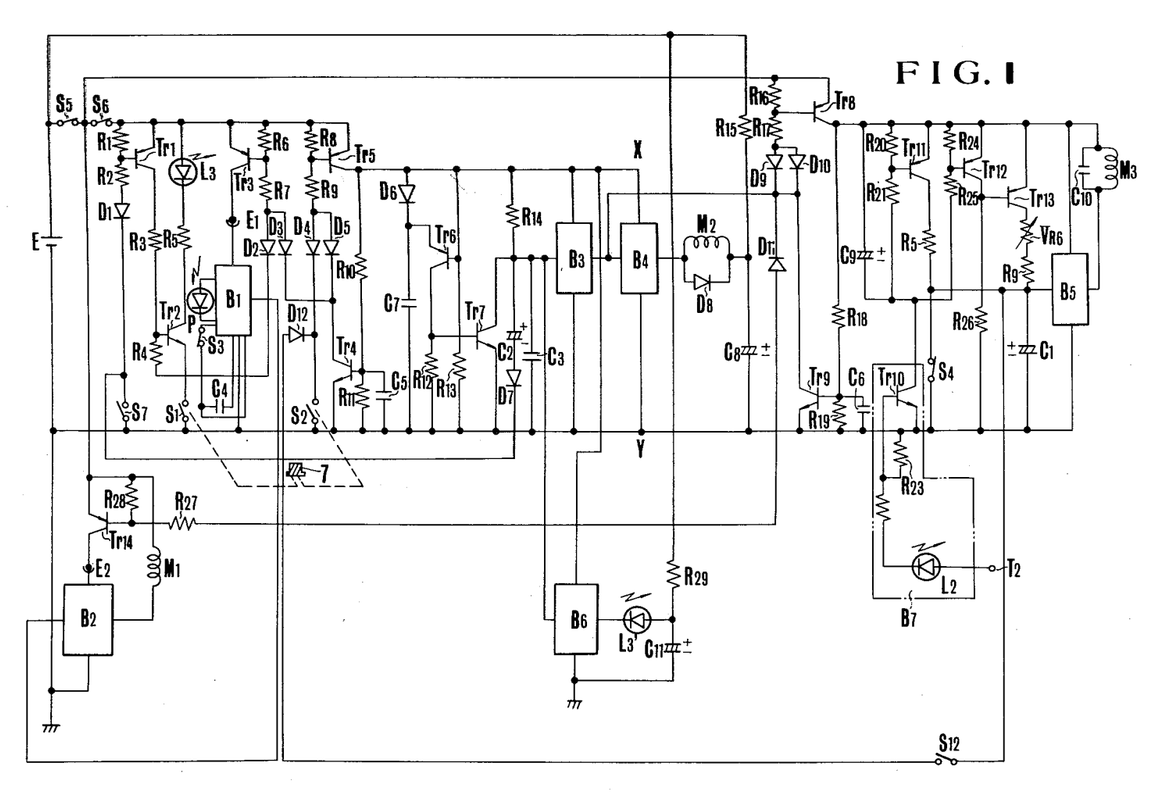
FIG. 1 is an exposure control circuit diagram of a camera according to the present invention.

Referring now to FIG. 1, there is shown a preferred embodiment of the present invention applied to a single lens reflex camera. The camera 1 with an interchangeable objective lens 2 is shown as including a reflex mirror 101 which, in its viewing position, reflects light entering through the lens 2 upward onto a focusing screen 12, where an image of an object being photographed is formed. Light from the image is radiated into a roof pentaprism 3, and therefrom directed to an eyepiece 103, reaching an eye of a photographer looking through the view finder. Positioned behind the exit face of prism 3 is a light value sensing element P such as a silicon blue cell of which the output is connected to a sensor circuit 106. The view finder further includes two light-emitting diodes $L_1$ and $L_2$, the first diode $L_1$ serving to teach the photographer whether or not the derived exposure value is in the range of aperture openings available in the lens aperture mechanism 105, and the second diode $L_2$ being connected to a terminal $T_2$ provided in an accessory shoe 4 so that when the main capacitor of a flash unit not shown mounted at the accessory shoe 4 is charged to a critical voltage level, the diode $L_2$ is energized to emit light. The mechanical mounting of the interchangeable objective lens 2 is provided with differential means 104 cooperating with a variable resistor $VR_2$ for introducing an exposure control parameter representing the maximum possible aperture size of the lens aperture mechanism 105 into the exposure control system.

FIG. 1 shows an exposure control circuit of a camera. A voltage divider containing series-connected resistors $R_1$ and $R_2$ is connected through a reverse-current preventing diode $D_1$ and the switch $S_7$ between the positive and negative buses of the system, the positive bus being connected through the series-connected switches $S_5$ and $S_6$ to the positive terminal of the battery E. The junction of the voltage divider is connected to the base electrode of a switching transistor $Tr_1$ for a driving circuit of the light-emitting diode $L_3$, the emitter electrode of transistor $Tr_1$ being connected to the positive bus. The driving circuit comprises a transistor $Tr_2$ having a base electrode connected through a resistor $R_3$ to the collector electrode of the transistor $Tr_1$, having a collector electrode connected through a resistor $R_5$ to one terminal of the diode $L_3$ and having an emitter electrode connected through switch $S_1$ to the negative bus. The base electrode of transistor $Tr_2$ is also connected through a resistor $R_4$ and a diode $D_2$ to one end of a voltage divider containing series-connected resistors $R_6$ and $R_7$, the opposite end of which is connected to the positive bus. Connected to the junction between resistors $R_6$ and $R_7$ is the base electrode of a transistor $Tr_3$ having an emitter electrode connected to the positive bus. The exposure metering circuit $B_1$ is connected between the collector electrode of transistor $Tr_3$ and the negative bus and has a switch $S_3$ and arranged to be opened just before the mirror is moved from the viewing position to the non-viewing position in response to the actuation of the solenoid of electromagnet $M_2$. The light value as sensed by the element P just before the initiation of pivoting movement of the mirror 101, therefore, is stored on the capacitor $C_4$ in the form of a voltage proportional to the light value. In order to control the period of supply of the electrical energy from battery E to the circuits in blocks $B_3$ and $B_4$, there is provided a transistor $Tr_5$ having a base electrode connected to the junction of a voltage divider containing series-connected resistors $R_8$ and $R_9$, the voltage divider being connected between the positive bus and negative bus through a reverse-current preventing diode $D_4$ and the switch $S_2$ and having an emitter electrode connected to the positive bus. Connected between the collector electrode of transistor $Tr_5$ and the negative bus is a number of branch circuits other than those in blocks $B_3$ and $B_4$, one of which is a voltage divider containing series-connected resistors $R_{10}$ and $R_{11}$ and having a junction connected to the base electrode of a transistor $Tr_4$, the collector electrode of transistor $Tr_4$ being connected both to the positive terminal of diode $D_4$ through a diode $D_5$ and to the positive terminal of diode $D_2$ through a diode $D_3$, and the emitter electrode of transistor $Tr_4$ being connected to the negative bus, whereby once transistor $Tr_4$ is rendered conducting in response to the closure of switch $S_2$, transistor $Tr_5$ remains in the conducting state despite of the fact that switch $S_2$ is opened as the shutter release button returns to the initial position, and another branch circuit which is provided for resetting two timing circuits including the capacitors $C_2$ and $C_3$ respectively. The resetting branch circuit comprises a transistor $Tr_6$ having a base electrode connected between the collector of transistor $Tr_5$ and one end of a resistor $R_{13}$, the other end of which is connected to the negative bus, an emitter electrode connected to the positive pole of a capacitor $C_7$ controlling the period of discharge of the capacitors $C_2$ and $C_3$, and having a collector electrode connected both to the negative bus through a resistor $R_{12}$ and to the base electrode of a transistor $Tr_7$. The transistor $Tr_7$ has a collector electrode connected to the junction of the timing circuit containing a resistor $R_{14}$ and the capacitor $C_3$ and has an emitter electrode connected to the negative bus. The resistor $R_{14}$ also serves to constitute the timing circuit or self-timer together with the capacitor $C_2$ of which the negative pole is connected through a diode $D_7$ to the junction between the diode $D_1$ and the self-timer actuation switch $S_7$. Connected to the positive poles of both capacitors $C_2$ and $C_3$ is the input of the self-timer action preindicating circuit in block $B_6$ having an output connected to one end of the light-emitting diode $L_3'$ of which the other end is connected between an energy storing capacitor $C_{11}$ and a charge-current regulating resistor $R_{29}$. The output of block $B_3$ is connected both to the input of block $B_4$ and to the base electrode of a transistor $Tr_{14}$ connected in the power supply path of block $B_2$ through a diode $D_{11}$ and a resistor $R_{27}$. The circuit in block $B_6$ may be constructed from a known switching circuit having a threshold voltage level slightly lower than that of a known switching circuit constituting the input stage of block $B_3$. The output of block $B_4$ is connected to one terminal of the solenoid of electromagnet $M_2$, the other terminal of which is connected to an energy storing capacitor $C_8$ for rapid energization of the solenoid. The capacitor $C_8$ is charged through a resistor $R_{15}$ from battery E without passing through switches $S_5$ and $S_6$.

The second energy supply control circuit for controlling the period of supply of electrical energy from battery E through switch $S_5$ to a daylight-and-flash exposure range changeover switching circuit and the circuit in block $B_5$ controlling the period of actuation of the solenoid of rear shutter curtain control electromagnet $M_3$ comprises a transistor $Tr_8$ having an emitter electrode connected to the positive bus between switches $S_5$ and $S_6$, having a base electrode connected to the junction of a voltage divider containing series-connected resistors $R_{16}$ and $R_{17}$ and having a collector electrode connected through a resistor $R_{18}$ to the base electrode of a transistor $Tr_9$. The transistor $Tr_9$ has a collector electrode connected through a diode $D_{10}$ to the negative terminal of the voltage divider $R_{16}$ and $R_{17}$, and has an emitter electrode connected to the negative bus. The base electrode of transistor $Tr_9$ is biased by a resistor $R_{19}$ across which a capacitor $C_6$ is connected. The changeover switching circuit comprises a first transistor $Tr_{11}$ having a base electrode connected to the junction of a first voltage divider containing series-connected resistors $R_{20}$ and $R_{21}$, a second transistor $Tr_{12}$ having a base electrode connected to the junction of a second voltage divider containing series-connected resistors $R_{24}$ and $R_{25}$, and a third transistor $Tr_{13}$ having a base electrode connected to the collector electrode of transistor $Tr_{12}$ and having a collector electrode connected to the positive terminal of a timing circuit containing the daylight shutter speed setting variable resistor $VR_6$, a resistor $R_9$ and the capacitor $C_1$, while a flash exposure timing resistor Rs being connected between the collector electrode of transistor $Tr_{11}$ and the positive pole of capacitor $C_1$, whereby when a transistor $Tr_{10}$ having a collector electrode connected to each of the first and second voltage dividers and having an emitter electrode connected to the negative bus is rendered conducting in response to attainment of the voltage of the flash tube main capacitor to a critical voltage level, the first transistor $Tr_{11}$ is rendered conducting to connect the resistor Rs to the capacitor $C_1$, while the second and third transistors $Tr_{12}$ and $Tr_{13}$ are rendered non-conducting to cut off resistors $VR_6$ and $VR_9$ from the capacitor $C_1$. The flash exposure timing circuit Rs and $C_1$ is designed to provide a time interval of, for example, 1/60 second. Connected across the capacitor $C_1$ is the switch $S_4$, so that when switch $S_4$ is opened in synchronism with the initiation of running-down movement of the front curtain, the circuit in block $B_5$ is rendered operative. In order to insure that the transistor $Tr_{10}$ remains in the conducting state to permit the full operation of the timing circuit Rs and $C_1$ despite of the fact that the voltage of the main capacitor of the flash unit suddenly drops at the initiation of energization of the discharge tube, there is provided a capacitor $C_9$ connected between the collector electrode of transistor $Tr_{10}$ and the positive bus or collector electrode of transistor $Tr_8$ so that the switching from the flash exposure range to the daylight exposure range is delayed by a sufficient time interval from the actuation of the flash unit. There is further provided a switch $S_{12}$ arranged to be closed when the shutter speed setting dial is set to the "B" position for adaptation to bulb photography and connected across the capacitor $C_1$ together with a diode $D_{12}$ and switch $S_2$.

Operation

The system of FIG. 1 is assumed to be in the shutter cocked position where switches $S_5$ and $S_6$ are closed. In order to make an exposure in the self-timer exposure control mode, a self-timer setting dial not shown is set to a particular position, and then the shutter release button is depressed to the first stroke stage, whereby switch $S_1$ is closed to render conducting transistors $Tr_1$ and $Tr_2$. Seeing the lighting of light-emitting diode $L_3$, the photographer assures himself of the fact that the camera operates in the self-timer exposure control mode. In the first stroke stage, responsive to the light value sensed by element P and stored in the memory-capacitor $C_4$ and to the output of variable resistor $VR_1$ preset in a desired position with the shutter dial, the computer circuit is deriving an exposure value representing an effective aperture opening. Upon further depression of button to the second stroke stage, the switch $S_2$ is closed to render conducting the transistors $Tr_4$ and $Tr_5$, whereby the circuits in blocks $B_3$ and $B_4$ are rendered operative, while the transistor $Tr_7$ remains in the non-conducting state permitting the timing capacitors $C_2$ and $C_3$ to be charged through the reistor $R_{14}$. When the voltage of capacitors $C_2$ and $C_3$ has reached to a certain level slightly lower than the threshold voltage level of block $B_3$, the block $B_6$ is rendered operative, thereupon the light-emitting diode $L_3$, is energized from capacitor $C_{11}$. It is to be noted that the former diode $L_3$ is deenergized when the finger pressure is remove from the shutter release button to open switch $S_1$, whereby the consumption of electrical energy which could be otherwise necessary can be saved, while the latter diode $L_3$, is deenergized in a time interval proportional to the amount of charge stored on capacitor $C_{11}$. After deenergization of diode $L_3$, the voltage of capacitors $C_2$ and $C_3$ further increases to the threshold level of block $B_3$, at which the mono-stable multivibrator in block $B_4$ is triggered to apply a driving pulse of rectangular waveform to the solenoid of electromagnet $M_2$. The output of block $B_3$ is also applied to the base electrode of transistor $Tr_{14}$, thereby block $B_2$ is rendered operative.

As the solenoid of electromagnet $M_2$ is energized, the mirror is moved from the viewing position to the non-viewing position, and at the same time, the diaphragm control mechanism is actuated whereby the latching lever 228 is disengaged from sector gear 223 permitting the slider 224 to turn clockwise to a position corresponding to the exposure value derived by the computer, and where the crown wheel 227 is arrested by the arresting lever 229 as the solenoid of electromagnet $M_1$ is energized by the output of block $B_2$. As soon as the diaphragm presetting means mounted in the mechanical mounting of the interchangeable objective lens 2 and cooperating with the sector gear 223 is adjusted to the resultant setting, the automatic diaphragm drive means in the camera body starts to set the diaphragm blades from the fully open position to the preset position.

On the other hand, the front curtain begins to run down to the fully open position at the time the upward movement of the mirror is terminated, thereby switch $S_4$ is closed to charge the timing capacitor $C_1$ through the variable resistor $VR_6$, resistor $R_9$, transistors $Tr_8$ and $Tr_{13}$ which were rendered conducting in response to the output of block $B_3$. At the termination of duration of a time interval preselected, the solenoid of electromagnet $M_3$ is energized causing the shutter rear curtain to run down to the closed position where the switch $S_5$ is opened to turn off all of the transistors $Tr_5$, $Tr_8$ and $Tr_{14}$. Such an arrangement of these switching transistors is advantageous from the minimum electric power consumption view point.

In order to make an exposure in the flash exposure range, a stroboscopic type flash unit is mounted on the camera at the accessory shoe so that a voltage detector such as a neon tube connected to the main capacitor capable of energizing the discharge tube of the flash unit is connected through the terminal $T_2$ to the diode $L_2$. Upon attainment of the voltage of the main capacitor to the threshold voltage level, transistor $Tr_{10}$ is rendered conducting, and transistor $Tr_{13}$ is rendered non-conducting, thereby the timing circuit comprising resistor $R_5$ and capacitor $C_1$ is brought into connection with the input of block $B_5$. The subsequent exposure control operation proceeds in a manner similar to that shown above.

In order to make an exposure in the normal daylight exposure control mode, switch $S_7$ is not closed, causing the timing circuit of resistor $R_{14}$ and capacitor $C_{13}$ to be connected to the input of block $B_3$. Therefore, before the transistor $Tr_5$ is rendered conducting by actuation of shutter release button, the capacitors $C_2$ and $C_3$ are discharged as the capacitor $C_7$ is charged. In a delay time interval of $R_{14} \times C_3$ from the initiation of conduction of transistor $Tr_5$, the block $B_3$ is brought into operation for energization of the solenoid of electromagnet $M_2$. During this delay time interval, the necessary operation of the exposure metering circuit can be performed with sufficient accuracy. The remaining exposure control operation is identical to that shown above.

In order to make an exposure in the bulb exposure control mode, the shutter speed setting dial is turned to place the symbol "B" in registry with an index, whereby the variable resistor $VR_6$ provides a particular resistance value. When the shutter release button is depressed to close swiches $S_1$ and $S_2$, the capacitor $C_1$ is short-circuited by the closed switch $S_{12}$ through the diode $D_{12}$, causing the front curtain to run down to the fully open position, while preventing the rear curtain to run down until the shutter button is released from the depression to open switch $S_2$. At the time switch $S_2$ is opened, the capacitor $C_1$ begins to be charged through resistor $VR_6$. After a predetermined time interval, the solenoid of electromagnet $M_3$ is energized permitting the rear curtain to run down, thereby the bulb exposure is terminated.

Figure 2:
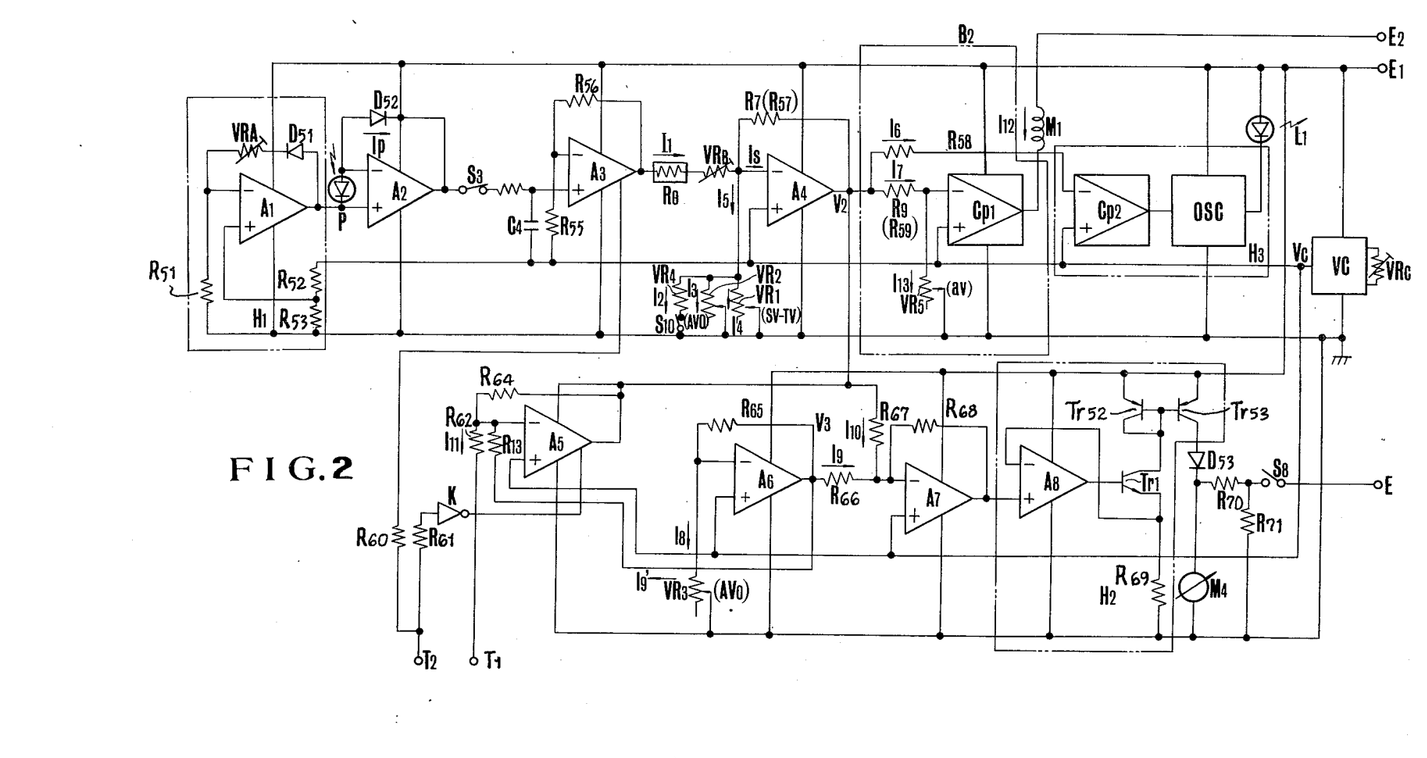
FIG. 2 is a schematic diagram of an electrical circuit suitable for use in block $B_1$ combined with block $B_2$ of FIG. 1.

The feature of the system which may be considered characteristic of the present invention will be better understood by reference to FIG. 2, wherein there is shown a practical example of an electrical circuit suitable for use in blocks $B_1$ and $B_2$ of FIG. 1, as employing variable resistor means in connection with an Appex computation circuit according to the present invention, and wherein reference characters $A_1$ through $A_8$ designate operational amplifiers, and amplifiers $A_3$ and $A_5$ are assumed to be turned on and off respectively when no signal is applied from the flash unit to the terminal $T_2$.

In FIG. 2, there is shown a reference voltage source Vc having a reference voltage control resistor VRc and having an output terminal connected through a reference voltage lead bus to one end of a voltage divider containing series-connected resistors $R_{52}$ and $R_{53}$ in block enclosed by dashed lines designated by $H_1$. The block $H_1$ is provided for serving as a temperature compensation means for the sensor circuit. The sensor circuit comprises a light value sensing element P and an operational amplifier $A_2$ having a diode $D_{52}$ connected in the feedback circuit thereof. A current Ip generated in the element P is logarithmically compressed in passing through the logarithmic amplifier $A_2$ and $D_{52}$ to produce an output which is applied through switch $S_3$ and a flicker removal resistor $R_{54}$ to one pole of the memory capacitor $C_4$ in which information in the form of a voltage $V_1$ directly proportional to the logarithm of the illuminance of a scene being photographed is stored. The voltage $V_1$ is amplified by a high input impedance buffer amplifier $A_3$ having an output terminal connected through a temperature compensating resistor $R_8$ and variable resistor VRB to an input of an operational amplifier $A_4$. Responsive to a current signal $I_1$ from the buffer amplifier $A_3$ and a current signal $I_5$ from the exposure control parameter setting variable resistors $VR_1$, $VR_2$ and $VR_4$, the operational amplifier $A_4$ produces a voltage signal $V_2$ proportional to the effective aperture size. When the magnitude of signal $V_2$ falls outside the range of aperture openings available in the associated lens aperture mechanism, the light-emitting diode $L_1$ in a block designated by $H_3$ is caused to flicker. The output of amplifier $A_4$ is applied to an input of an operational amplifier $A_7$ in the form of a current signal $I_{10}$. Also connected to the input of amplifier $A_7$ is an output of a buffer amplifier $A_6$ through a resistor $R_{16}$. The amplifier $A_6$ is provided with the variable resistor $VR_3$ for producing a current signal $I_9$ proportional to the maximum possible aperture opening of the individual exchangeable objective lens. The output of amplifier $A_7$ which is proportional to the sum of $I_9$ and $I_{10}$ is applied to a drive circuit designated by $H_2$ for driving a meter $M_4$ to indicate the computed exposure value or diaphragm value.

In the case of the flash exposure control mode, upon advent of a signal from the terminal $T_2$, the amplifier $A_3$ is turned off, while the amplifier $A_5$ is turned on, thereby the signal in the form of a current $I_{11}$ is applied to amplifier $A_5$ which in turn produces an output voltage signal $V_2$ as a computation result of the current signals $I_{11}$ and $I'_9$.

The circuit in block $B_2$ comprises a comparator $CP_1$ having an input connected through a resistor $R_{59}$ to the output of amplifier $A_4$ as well as to the variable resistor $VR_5$, so that when a current signal $I_7$ passing through resistor $R_{59}$ is balanced with a current signal $I_{13}$ passing through the variable resistor $VR_5$, the comparator $CP_1$ produces no output which is applied to the solenoid of electromagnet $M_1$ controlling the actuation of the arresting mechanism.

Consideration will next be given to the operating principles of the circuit of FIG. 2. As the amplifiers $A_3$ and $A_5$ are in the operative and inoperative positions respectively for daylight photography, the depression of the shutter release button to the first stroke stage causes connection of an electric power source $E_1$ to the whole circuit. Upon receiving of light entering through an objective lens with an adjustable diaphragm mechanism having a maximum aperture size designated by Avo and having an actual aperture size designated by Avc, the light value sensing element P produces a current Ip which is then stored on the capacitor $C_4$ in the form of a voltage $V_1$ proportional to the scene illuminance level designated by Bv. Accordingly, the current $I_1$ appearing at the output of amplifier $A_3$ and passing through resistors R$\theta$ and VRB may be expressed by the following formula, being proportional to the value (Bv-Avo-Avc)

$$I_1 = (V_1 - Vc/R\theta + VRB)$$

while currents $I_2$, $I_3$ and $I_4$ passing through variable resistors $VR_1$, $VR_2$ and $VR_4$ respectively may be expressed by the following formulae, being proportional to K-factor, the actual aperture size Avc and difference between film speed Sv and shutter speed Tv or a value (Sv-Tv) respectively:

$$I_2 = Vc/VR_4 \; I_3 = Vc/VR_2 \; I_4 = Vc/VR_1$$

Hence, we have the input current of amplifier $A_4$ as the sum of currents $I_1$ and $I_5$.

$$I_1 + I_5 = (V_1 - Vc/R\theta + VRB) + Vc\,[1/VR_1 + 1/VR_2 + 1/VR_4]$$

and the output voltage $V_2$ of amplifier $A_4$ as expressed by $$V_2 = (I_1 + I_5) \times R_{57} + Vc$$

It is to be noted that the sum of currents $I_1$ and $I_5$ is proportional to the deviation of the correct aperture size from the maximum aperture size.

When the voltage $V_2$ is larger than the reference voltage Vc, and when the current $I_6$ passing through a resistor $R_8$ connected to the output of amplifier $A_4$ is equal to or larger than zero, the diaphragm mechanism is adjustable in conformance to the output of the amplifier $A_4$, so that the block $H_3$ remains in the inoperative position where the light-emitting diode $L_1$ is not lighted. However, when the current $I_6$ is less than zero, the block $H_1$ is rendered operative to energize diode $L_1$.

In order to introduce the computed result to the current meter $M_4$ in terms of the correct aperture value, the variable resistor $VR_3$ for setting the maximum aperture size Avo is connected to amplifier $A_6$. As the current $I_8$ passes through variable resistor $VR_3$, the output voltage $V_3$ of amplifier $A_6$ may be expressed by $$V_3 = I_8 \times R_{65} + Vc$$

Hence, we have currents $I_9$ and $I_{10}$ passing through resistors $R_{66}$ and $R_{67}$ respectively which are added to each other by amplifier $A_7$ as expressed by $$I_9 + I_{10} = (R_{65}/R_{66})\,I_8 + (V_2 - Vc/R_{67})$$

It is to be noted that the sum of currents $I_9$ and $I_{10}$ is proportional to the value (Bv + Sv − Tv + K), or the correct aperture value, the output of amplifier $A_7$ is applied to block $H_2$ for driving the meter $M_4$.

The depression of the shutter release button to the second stroke stage, causes energization of solenoid $M_1$ through the comparator $CP_1$, and movement of variable resistor $VR_3$. As the resistance value of variable resistor $VR_5$ varies, the input of comparator $CP_1$ receives ever varying currents $I_{13}$ passing through variable resistor $VR_5$ together with a constant current $I_7$ passing through the resistor $R_9$. The sum of currents $I_7$ and $I_{13}$ may be expressed by the following formula $$I_7 + I_{13} = (V_2 - Vc/R_{59}) + Vc/VR_5$$

In the case of $I_7 + I_{13} > 0$, the comparator $CP_1$ produces a current $I_{12}$ flowing through the solenoid $M_1$, while in the case of $I_7 + I_{13} \leq 0$, it produces no current causing the moving variable resistor $VR_5$ to be arrested at a position for providing the correct aperture size, as has been seen above.

It will be appreciated that each of the variable resistors $VR_1$, $VR_2$, $VR_3$, $VR_4$ and $VR_5$ may be constructed to provide resistance values as a function of $Ro/\theta$, wherein $Ro$ is the maximum resistance value, and $\theta$ is the amount of displacement of its slider. Therefore, when a certain bias voltage $Vc$ is applied to each variable resistor, the current $I$ flowing through the resistor $VR_5$ becomes $I = Vc/Ro \times \theta$, being varied as a linear function of the displacement amount of slider. As a result, the variable resistors $VR_1$ through $VR_5$ may be associated with external exposure control parameter setting members such as dials, in the above mentioned examples, shutter speed and film speed setting dials cooperating with the respective isometric scales without the necessity of any additional complicated means in performing Appex computation by the operational amplifiers $A_4$, $A_6$ and $A_7$. Another advantage deriving from the grounding of the slider of each of the variable resistors $VR_1$ through $VR_5$ is that there is no need to make the provision for preventing current to leak out from the lead wire connected to the slider, and accordingly there is no need to shield insulate the slider. It is to be noted that each of the amplifiers $A_2$ through $A_7$ has a negative input terminal connected to the reference voltage lead, while the various signals are applied to their positive terminals, taking values within the range between the power voltage and the earth in reference to the voltage $Vc$.

Figure 3:
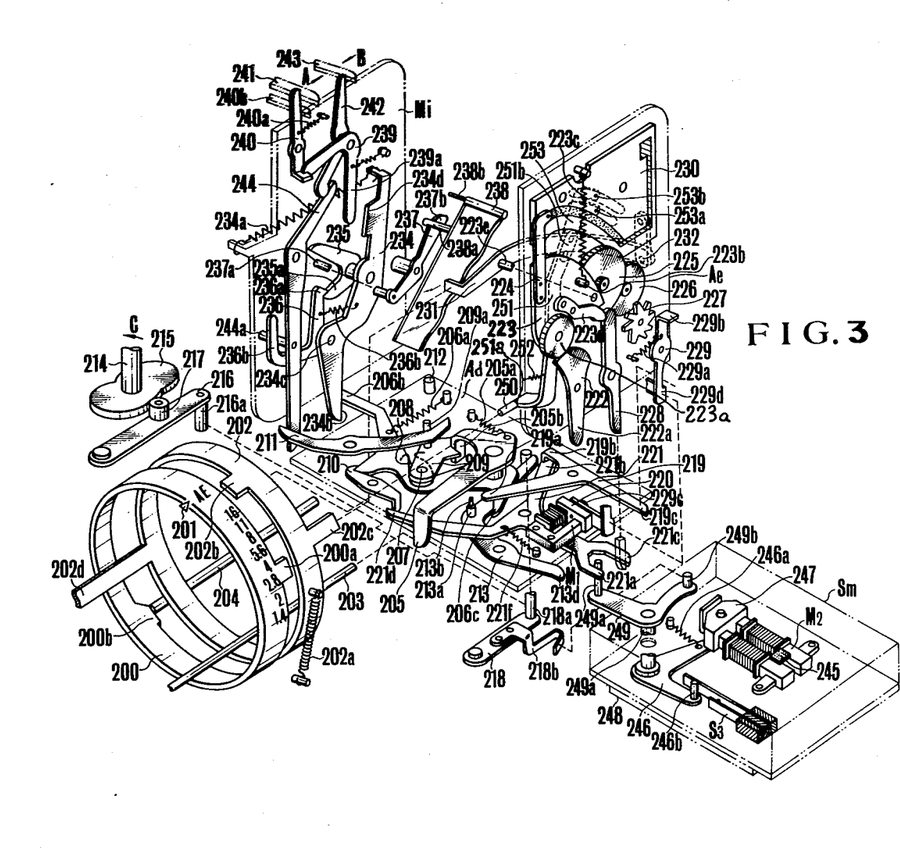
FIG. 3 is a schematic exploded perspective view of an internal mechanism of a camera having a circuit shown in FIG. 1 and FIG. 2.

FIG. 3 shows the essential parts of a single lens reflex camera adapted for use with the circuit of FIG. 2, and including a diaphragm control mechanism associated with the above mentioned variable resistors, a drive mechanism for a lens aperture mechanism, a mirror mechanism, and a release mechanism, each of which will now be described.

The lens aperture mechanism mounted in an individual interchangeable objective lens barrel not shown comprises a manually operable diaphragm preselecting ring 200 having cut thereon a symbol AE indicative of the shutter preselection automatic daylight exposure control mode and a diaphragm scale with graduations, namely, 16, 11, . . . , 1.4, each of which can be brought into registry with a stationary index 201 provided on the barrel and having a stop lug 200a and a cam lobe 200b, and an automatically operable diaphragm presetting ring 202, which is biased by a spring 202a in a clockwise direction as viewed in the figure and which has a lug 202b arranged to be engageable with the stop lug 200a. The diaphragm presetting ring 202 is provided with first and second arms 202c and 202d which extend in parallel to the optical axis of the lens rearwardly and forwardly respectively. The position of the second arm 202c determines the position of a not shown bell crank member through a not shown cam ring, which in turn determines the amount of movement of a not shown drive ring member for the diaphragm blade assembly, thereby the size of the exposure aperture is adjusted in conformance to the either preselected or automatically controlled setting of the ring 202. The drive ring member has a pin 203 fixedly mounted thereon and rearwardly extending in parallel to the optical axis of the lens into the path of movement of a drive lever 205 of the diaphragm drive mechanism mounted on a plate Ad. In order to switch the camera from the automatic diaphragm control mode to the manual diaphragm control mode, or vice versa in response to the setting of the diaphragm preselecting ring 200 into or out of registry with the index 201 respectively, there is provided a pin 204 arranged to be brought into riding-on engagement with the cam lobe 200b when the ring 200 is turned to place symbol AE in registry with index 201.

The diaphragm drive mechanism comprises the drive control lever 205 pivoted at a shaft and biased by a spring 205a in a counter-clockwise direction, a spring-powered drive lever 206 pivoted at the common shaft of the lever 205 and having a transmission lever 209 pivoted at a pin 207 upwardly extending from lever 206 at a location near the center thereof, the lever 209 having a pawl arranged to be engageable and disengageable with a perpendicularly downwardly extending projection 205b of drive control lever 205 having an upwardly extending pin 209a and being biased by a spring 208 to urge the pawl of lever 209 for driving engagement with the projection 205b and a pawl lever 210 for latching the drive lever 206 in the cocked position against the force of spring 206a. In order to disengage the transmission lever 209 from control lever 205 as soon as the rear shutter curtain has run down, there is provided a lever 211 engaging at one end thereof the pin 209a, the opposite end of which is operatively connected to a rear curtain drive gear not shown through a lever arrangement including levers 242, 243 and 244. In order to limit the clockwise movement of drive lever 206, there is provided a stopper pin 212 positioned in one corner of plate Ad.

The plate Ad further carries an actuating and resetting mechanism which comprises a three-armed lever 221 engaging at one arm end 221d the latching lever 210, engaging at a tapered end of another arm 221b one arm 219b of another three-arm lever 219 cooperative at another arm end 219c with an arresting lever 229, and engaging at one forked portion 221c of the other arm a latching lever 228 of the diaphragm control mechanism, and a resetting lever 213 having coaxial projection pins 213a and 213b mounted at a location near the center thereof for engagement with lever arms 206a and 219a respectively and having one arm 231d engaging a pin 218a mounted on a lever 218 constituting part of a cocking mechanism. The cocking mechanism further includes a lever 216 having a cam follower roller 217 arranged for engagement with a camming surface of a cam disk 215 mounted on one end of a film winding shaft 214, the opposite end of which has a film winding lever not shown.

The mirror mechanism includes a mirror 238 pivotally mounted on a pair of stub shafts 238b and positioned between the objective lens and the focal plane shutter not shown. The mirror 238 is movable between its viewing and non-viewing positions by a control lever 237 in engagement at one end portion 237b with a stud 238a extending from the side of a support member of mirror 238, the opposite end portion of lever 237 having an elongated pin 237a extending into a space of an angular lever 235 rotatably mounted on a common pivot shaft of drive lever 234. One arm 235a of angular lever 235 is latched by a pawl 236a of mirror return control lever 236 which is pivotally mounted on drive lever 234 at a pin 234c, which is biased by a spring 236b to urge the pawl 236a for latching engagement with the angular lever end 235a, and which has a tail 236c arranged to cooperate with a pin 244a mounted on the lever 244 of which the downwardly extending arm end engages the lever 211 of the diaphragm drive mechanism. The mirror drive control lever 234d is further provided with a projection 234d cooperative with one arm 239a of a lever 239 constituting a front curtain actuating lever arrangement including a spring 240a-biased lever 240 engaging at one end with the other arm of lever 239, a front curtain latching lever 241, and a resetting lever 240b for the lever 240. The levers 239 and 242 are mounted on a common shaft in movable relation independently of each other.

The diaphragm control mechanism mounted on a plate Ae includes a sector gear 223 having a pinion 223a fixedly coaxially mounted thereon the pinion 223a engaging with a toothed segment of a resetting lever 222 of which a projection 222a engages with the lever end 213d, having an arm 223d fixedly mounted thereon for engagement with the pawl of a latching lever 228 of which the tail engages with the forked portion 221c of the diaphragm drive actuating lever 221, and having a slider 224 of the variable resistor $VR_5$, a gear train or speed-increase governor including gears 225 and 226, a crown wheel 227, and an arresting lever 229 which is biased by a spring 229a in a counter-clockwise direction, which has a pawl 229b arranged for engagement with any one tooth of wheel 227, and which has a tail 229d fixedly carrying an armature 220 cooperative with an electromagnet $M_1$. The diaphram control mechanism is further provided with a variable resistor assembly device having a common insulator substrate 230 of which the right-side surface is provided with an arcuate pattern of resistance material constituting together with slider 224 the above mentioned variable resistor $VR_5$, and the left-side surface which is provided with two arcuate patterns of resistance material constituting the above mentioned variable resistors $VR_2$ and $VR_3$ together with the respective sliders (see FIG. 4A). On the opposite side of plate Ae is pivotally mounted an arm 232 having a free end on which a diaphragm presetting ring 202 control lever 231 is pivotally mounted at one end thereof, the opposite end of which engages with the end portion of the arm 202c. The lever 231 is connected to the sector gear 223 through a pin 223e arranged in eccentrically parallel relation to the shaft of sector gear 223. The sector gear 223 is biased in a counterclockwise direction by a spring 223c which is weaker than spring 202a.

The camera release mechanism is shown with a casing made of a non-magnetic material indicating by dot-and-dash lines Sm, as comprising an electromagnet $M_2$ associated with a permanent magnet 245, an armature 247 cooperative with the magnets $M_2$ and 245 and movably mounted on one arm of a lever 246 which is biased in a counter-clockwise direction by a spring 246a weaker than the attracting force of the permanent magnet 245 but stronger than the spring 221f of the actuating lever 221, and which has an upwardly extending pin 246b mounted on the other arm thereof and arranged to operate the memory switch $S_3$ in such a manner that when the solenoid of electromagnet $M_2$ is energized to cancel the magnetic force of permanent magnet 245, the lever 246 is turned about a crank shaft 249a counterclockwise to open switch $S_3$. The counterclockwise movement of lever 246 is transmitted through the crank shaft 249a extending through a hole provided in the upper panel of the casing Sm to a bell-crank 249 mounted on the opposite end of crank shaft 249a to that connected to the lever 246. The bell-crank 249 has two pins 249a and 249b mounted on the respective arms and engaging with one forked portion 221a of actuating lever 221 and a resilient member 218 of the cocking lever 218 respectively. The casing Sm is provided with a shield member 248 for shielding the magnetic influence.

Figure 4A:
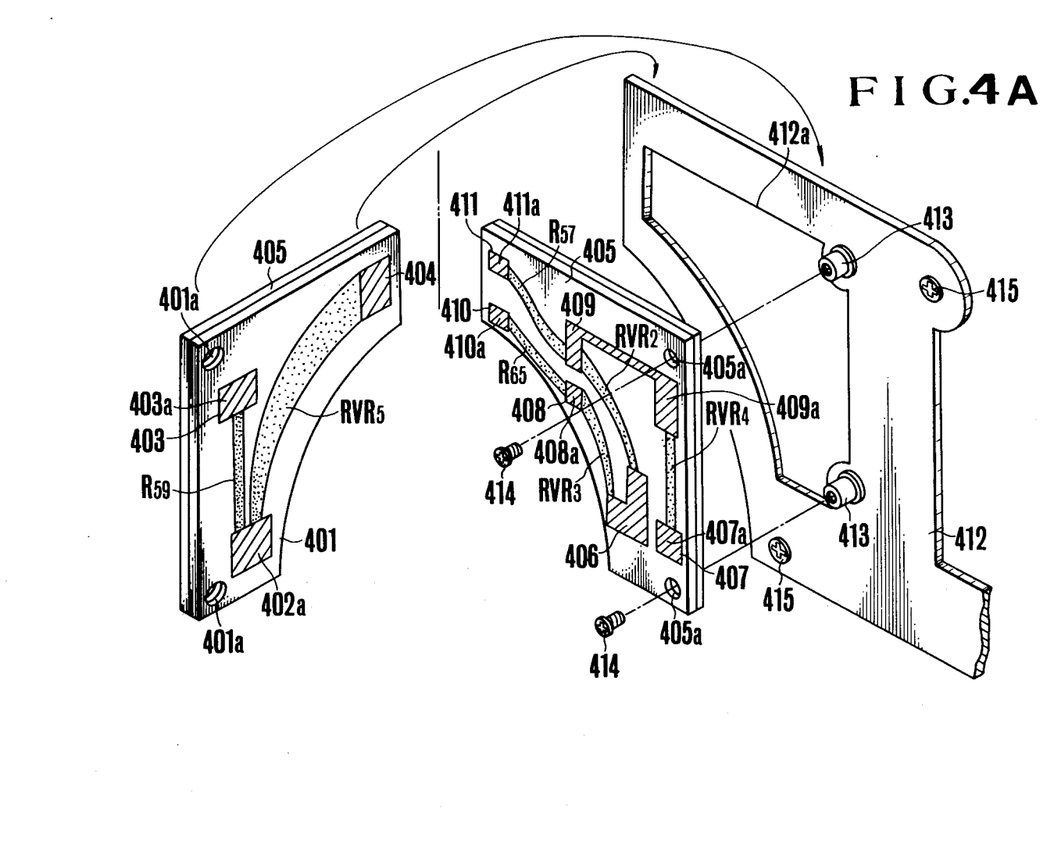
FIG. 4A is an exploded perspective view of a variable resistor device having a function of combined first and second exposure control parameter setting means.
Figure 4B:
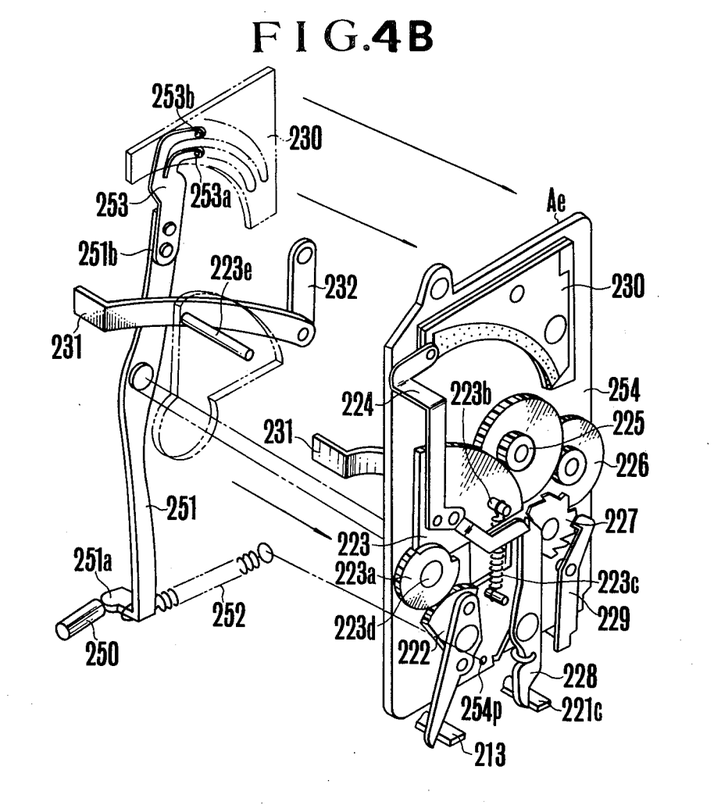
FIG. 4B is an exploded perspective view of a diaphragm control mechanism of the camera of FIG. 3 having the variable resistor device of FIG. 4A, particularly showing an operating relationship between the first and second resistance substrates and their associated sliders of the device of FIG. 4A.
Figure 4C:
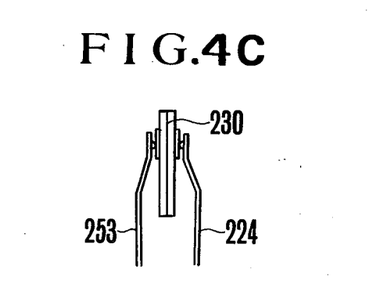
FIG. 4C is a sectional view showing an arrangement of the first and second sliders with respect to the combined resistance substrates.

A differential mechanism for introducing into the diaphram control mechanism exposure control parameters representing different maximum aperture sizes Avo and aperture compensations Avc of the individual interchangeable objective lenses comprise a corrective pin 250 fixedly mounted on the used lens barrel and having a different length with different F-number, a lever 251 which is biased by a spring 252 in a counter-clockwise direction to urge one end 251a thereof for abutting engagement with the end of corrective pin 250, and of which the opposite end 251b has a slider 253 having two arms 253a and 253b constituting parts of the above mentioned variable resistors $VR_3$ and $VR_2$ for setting the maximum aperture size Avo and aperture compensation value Avc respectively, as shown in more detail in FIGS. 4A–C.

FIG. 4A shows an example of modification of the variable resistor assembly device 230 of FIG. 3, wherein instead of using the single substrate, the device of FIG. 4A is shown as constructed by use of two substrates 401 and 405. The first substrate 401 has three electrodes 402, 403 and 404 formed on one polished surface thereof by means of vacuum depositing, metal-glazing or the like, and has a resistor $R_{59}$ corresponding to the resistor $R_9$ of FIG. 2 formed between the electrodes 402 and 203 by means of metal coating and the like, and a resistor $RVR_5$ formed between the electrodes 402 and 404. A pair of holes 401a provided through the first substrate 401 serve as a part of the position adjusting means and interconnecting means when the first and second substrates 401 and 405 are assembled with each other as sandwiching an apertured support frame 421. The second substrate 405 has six electrodes 406, 407, 408, 409, 410 and 411 formed on one surface thereof, and has a resistor $RVR_3$ formed between electrodes 406 and 408, a resistor $R_{65}$ between electrodes 406 and 408, a resistor $R_{57}$ between electrodes 409 and 411, a resistor $RVR_2$ between electrodes 406 and 409, and a resistor $RVR_4$ between electrodes 407 and 409. Each of the resistors may be formed by metal coating technique employing vacuum deposition. The second substrate 405 is also provided with a pair of holes 405a bored therein in predetermined spatial relation to each other and to the holes 401a of the first substrate 401. The first and second substrates are fixedly secured on the support frame 412 by means known in the art, in this instance, a male screw 414 with a female screw 413 for each hole 401a and 405a, being oriented so that the opposite side of each substrate to that having the resistor and electrode elements is contacted with the support frame 412. The support frame 412 is fixedly secured to the plate Ae or camera housing by means of fasteners 415 such as screws as shown in FIG. 4B to constitute the variable resistors $VR_2$, $VR_3$ and $VR_5$ of FIG. 2 together with sliders 253b, 253a and 244 arranged to be slidably movable on the resistors $RVR_2$, $RVR_3$ and $RVR_5$ respectively. The variable resistors are connected in the circuit of FIG. 2 with lead wires 402a, 403a, 406a, 407a, 408a, 409a, 410a and 411a of which one ends are terminated at the respective electrodes.

For facilitating the assembling of the first and second substrates on the support frame in alignment with each other and to the sliders with high accuracy, a suitable binder may be used in combination with the position adjusting means such as the above mentioned holes, or a slide plate arranged in or on the support frame, for example.

As shown in FIG. 4B, the first and second substrates are fixedly secured on the support frame as constituting part of the plate 254 of the diaphragm control mechanism Ae having a sliders-carrying lever 251 arranged to cooperate with the corrective pin 250 of the individual interchangeable lens barrel. The lever 251 is biased by a compressed spring 252 to urge on lever end 251a for abutting engagement with the end of the corrective pin 250, the opposite end of which lever 251 has a slide 253 having two arms 253a and 253b arranged to be slidably movable on the resistors $RVR_3$ and $RVR_2$ formed on the second substrate of the resistor device 230 respectively, serving as means for setting the F-number Avo and aperture compensation value Avc. The resistor $RVR_4$ is likewise associated with a not shown slider for setting K-factor in the automatic exposure control apparatus.

The operation of the apparatus of FIG. 3 is as follows. The desired interchangeable lens having a specified maximum aperture size Avo and compensation value Avc is selected, and its barrel is attached to the camera body not shown while the corrective pin 250 being in contact with the differential lever end 251a, thereby the exposure control parameters Avo and Avc are introduced to the variable resistor assembly device 230.

In order to make an exposure in the shutter preselection automatic daylight exposure control mode, the camera operator turns the diaphragm preselecting ring 200 to place symbol "AE" in registry with the index 201 as shown in FIG. 3, causing the cam follower pin 204 to ride on the cam lobe 200b. Next the shutter release button 7 of FIG. 1 is depressed to energize the solenoids of electro-magnet $M_1$ and $M_2$ in the casing Sm, thereby the arresting lever 229 is held from rotation, and the armature carrying lever 246 is turned counter-clockwise under action of spring 246a. Such a movement of lever 246 causes the opening of memory switch $S_3$ as well as a counter-clockwise movement of bell-crank 249 which in turn causes the actuating three-armed lever 221 to turn clockwise against the force of spring 221f through the pin 221c-and-forked portion 221a connection.

As the lever 221 is turned clockwise, the three latching members, i.e. levers 210, 219 and 228 are caused to move from their latching positions. The lever 228 is turned clockwise through the forked portion 221c-and-lever end 228 connection, thereby its pawl is disengaged from the arm 223d of gear sector 223 permitting sector 223d to move clockwise under the action of spring 202a which overcomes the force of spring 223c connected between sector 223 and plate Ae. Such a turning movement of sector 223 causes a sliding movement of slider 224 on the resistor $RVR_5$ of the first or single substrate while the variable resistor $VR_5$ providing ever-varying resistance values. When the resistance value has reached a level dependent upon an exposure value determined by the exposure metering circuit $B_1$ of FIG. 2, the comparator $CP_1$ produces no output which is applied to the solenoid of electromagnet $M_1$, thereby the arresting lever 229 is turned counter-clockwise under the action of spring 229a to arrest the rotating crown wheel 227. This turning movement of sector 223 also causes a downward movement of the control lever 231 which in turn causes a clockwise movement of diaphragm presetting ring 202, thereby the final angular position of ring 202 is adjusted in accordance with the exposure value.

As the lever 210 is turned counter-clockwise, the spring powered diaphragm drive lever 206 is disengaged from the lever pawl 210, and is then turned clockwise under the action of spring 206a, while turning the diaphragm control lever 205 in the clockwise direction in cooperation with the lever 209, thereby the pin 203 which operates with the diaphragm blade drive ring in the lens aperture mechanism is moved in a clockwise direction about the optical axis of the lens, while varying the size of the aperture opening from the maximum one to one dependent upon the angular position of the presetting ring 202. In response to the clockwise movement of diaphragm drive lever 206, the mirror drive lever 234 is actuated for turning movment in the counter-clockwise direction under the force of spring 234a through the abutting engagement at the lever end 234b with the lever end 206b. Such a movement of lever 234 is transmitted through levers 236 and 235 to the mirror control lever 237 causing the mirror 238 to move from the viewing position to the non-viewing position.

The shutter release lever arrangement 239, 240 and 241 is actuated when the projection 234d of the mirror drive lever 234 strikes the lever end 239a, and the lever 241 is caused by the action of spring 240a to move in the direction indicated by arrow A, thereby the front curtain is released from the cocked position running down to the fully open position. After a time interval selected by the shutter speed setting dial 110 from the initiation of the exposure, the lever 234 is moved in the direction indicated by arrow B causing a counter-clockwise movement of lever 242. As the lever 244 is turned clockwise by lever 242, the latch lever 236 is turned counter-clockwise against the force of spring 236b to disengage the pawl 236a from the mirror return control angular lever 235, thereby the mirror 238 is returned to the viewing position. In this time interval, the clockwise movement of lever 244 also causes disengagement of lever 207 from the diaphragm control lever 250 against the force of spring 208 through the lever 211, thereby the diaphragm blades are reset to the maximum open position as the lever 205 is turned counter-clockwise under the action of spring 205a.

After the exposure operation has been terminated, the film winding lever may be cocked to advance the film through a frame and to set the shutter to the cocked position by means including lever 240b, while turning the shaft 214 in the counter-clockwise direction indicated by arrow C. During this time, the cam disk 215 and follower roller 217 connection causes a clockwise movement of lever 218 which in turn causes a clockwise movement of resetting lever 213 through the pin 218a, and also causes a counter-clockwise movement of bell-crank 249 through the resilient member 218b-and-pin 249b connection. As the lever 213 is turned clockwise, the diaphragm drive lever 206 is turned counter-clockwise direction through the end 206a-and-pin 213a connection against the force of spring 206a to the latched position by lever 210, and the escapement lever 219 is turned counter-clockwise through the end 219a-and-pin 213b connection to the latched position where the downwardly bent portion 219b of lever 219 is engaged with the tapered portion 221b of the actuating lever 221 while turning the arresting lever 229b clockwise against the force of spring 229a to disengage the pawl 229b from the crown wheel 227. The clockwise movement of lever 213 further causes a clockwise movement of lever 222 through the end 222a-and-end 213d connection, while turning the diaphragm presetting ring 202 in the counter-clockwise direction to the start position illustrated in FIG. 4 against the force of spring 202a. On the other hand, the movement of diaphragm drive lever 206 causes a clockwise movement of mirror drive lever 234 against the force of spring 234a, thereby the lever 236 is brought into engagement with the angular lever 235.

As the bell-crank 249 is turned clockwise, the lever 246 is turned against the force of spring 246a to close switch S₃, while permitting the resilient member 218b to buffer the rapidly increasing magnetic force of permanent magnet 245 applied to the armature 247 with decrease in the distance between the magnet 245 and the armature 247.

In order to make an exposure in the manual exposure control mode, the diaphragm presetting preselecting ring 202 is turned to place the symbol "AE" out of registry with the index 201, thereby the cam lobe 200b is moved away from the pin 204 causing the arresting mechanism to be locked in the inoperative position. Upon depression of shutter release switch 7, the gear sector 223 is released from the lever 228 to turn until the lug 202b of ring 202 abuts the stop lug 200a of the ring 200. The subsequent exposure operation proceeds in a manner similar to that shown in connection with the shutter preselection exposure control mode.

It will be seen from the foregoing description that the described embodiment of the present invention accomplishes the above mentioned objects of the invention by providing an exposure control means in combination with a novel variable resistor assembly device 230. An advantage of deriving from the possibility of fabricating a plurality of resistor elements, namely, variable and fixed resistor elements on one side or both sides of a single substrate, is that the various characteristics of all the resistor elements can be held to specific and ideal values in manufacturing such devices. As the result, deviation of the outputs of the device from the true values due to the difficulty of resistance impartment control and the variation of temperature distribution in the apparatus and camera can be minimized to improve the exposure control accuracy. Further the present invention suggests the possibility of employing printed circuits for connection of the resistors with each other and to the circuit of the system. In this case, it is made possible to incorporate in unison almost all of the resistors necessary for the exposure control circuit in the camera.

It is to be noted that the resistance value in unit area is maintained constant over the entire area of the individual resistor so that the variable resistor provides resistance values as a linear function of slider displacement. With such a variable resistor assembly device, it is made possible to reduce the complexity of the Appex computation circuit which might be otherwise made as in the prior art. This is very advantageous for production of compact cameras having high performance exposure control apparatus mounted therein.

What is claimed is:

1. A photographic camera having an automatic exposure control apparatus, comprising:
    a photo-sensing means to sense an object brightness, said means providing an electric signal corresponding to a logarithmically converted value of an object brightness;
    an exposure adjusting means for controlling the amount of exposure of photographic film;
    an exposure control parameter setting means for setting exposure control parameters other than the parameter selected by said exposure adjusting means;
    a resistor means to generate an electric signal corresponding to the value set by said exposure control parameter setting means, wherein said resistor means has a fixed resistance and at least one variable resistor having a slider being grounded, the resistance value of said variable resistor being set as the slider is shifted corresponding to the setting action of said exposure control parameter setting means, and the resistance value characteristics of the variable resistor being set so as to be proportional to the reciprocal of the amount of shifting of the slider;
    an electronic control circuit, which has an operational amplifier having said fixed resistance used as a feedback resistance and said variable resistor used as an input resistance, and a bias circuit to add a predetermined bias voltage to the other input of said operation amplifier, wherein said operational amplifier conducts APEX computation of the output signal of said resistor means and the output signal of said photosensing means, and wherein said exposure adjusting means is functionally coupled with said electronic control circuit and said adjusting means sets an appropriate exposure value based on the output of the operational amplifier.

2. A photographic camera having an automatic exposure control apparatus comprising:
    (a) an interchangeable objective lens;
    (b) lens aperture means normally set in the maximum aperture position;
    (c) presetting means for presetting said lens aperture means;
    (d) light value sensing means arranged to receive light passing through said objective lens and said lens aperture means with the maximum aperture opening;
    (e) signal transmitting means mounted in the camera body and arranged upon actuation of camera release member to operate with said presetting means;
    (f) first variable resistor means having a grounded slider associated with said signal transmitting means and capable upon displacement of said signal transmitting means of providing a resistance value corresponding to the reciprocal of the amount of said signal transmitting means displaced;
    (g) a first electronic control circuit coupled to said variable resistor means and associated with a computing circuit and with a bias circuit for applying a constant bias voltage to said variable resistor means to produce a current signal which is then applied to said computing circuit;

(h) exposure control parameter setting means for setting at least one exposure control parameter other than diaphragm value;

(i) at least one second variable resistor means being variable in an association with said exposure control parameter setting means, wherein said resistor means has a fixed resistance and at least one variable resistor having a slider being grounded, and the resistance value of said variable resistor is set as the slider is shifted corresponding to the set value by the setting means, and the resistance value characteristics of the variable resistor are set to be proportional to a reciprocal of the amount of shifting of the slider;

(j) a second electronic control circuit which has said variable resistor means connected thereto, wherein said circuit has an operation amplifier having said fixed resistance as a feedback resistance and said variable resistor as an input resistance, and a second bias circuit to add a predetermined bias to the other input of said operation amplifier, said first operation circuit and the operation amplifier being mutually connected electrically for conducting a photographic appex computation of the signal current impressed on each input and for presenting an electric output corresponding to an appropriate exposure diaphragm aperture value; and (k) regulating means for regulating the amount of displacement of said signal transmitting means in accordance with the output of said second electronic control circuit.

3. The photographic camera according to claim 2, in which the resistor means has a base plate on which the fixed resistor and the variable resistor are placed.

* * * * *

UNITED STATES PATENT OFFICE
CERTIFICATE OF CORRECTION

Patent No. 4,124,855                     Dated November 7, 1978

Inventor(s) Masanori Uchidoi, et al

It is certified that error appears in the above-identified patent and that said Letters Patent are hereby corrected as shown below:

In the heading of the Patent [75] and [30] should read as follows

[75]  Inventors:  Masanori Uchidoi, Kanagawa-ken; Hideaki Miyakawa, Tokyo; Hiroshi Aizawa, Tokyo; Masayoshi Yamamichi, Tokyo; Osamu Ohshima, Tokyo; Tokuichi Tunekawa, Yokohama, all of Japan

[30]  Foreign Application Priority Data

Jul. 9, 1974 [JP]  Japan............49-78496

Jul. 26,1974 [JP]  Japan............49-85660

Jul. 26,1974 [JP]  Japan............49-85661

Signed and Sealed this

Ninth Day of October 1979

[SEAL]

Attest:

RUTH C. MASON
Attesting Officer

LUTRELLE F. PARKER
Acting Commissioner of Patents and Trademarks